United States Patent
Yamaura et al.

(10) Patent No.: US 10,243,222 B2
(45) Date of Patent: Mar. 26, 2019

(54) GASKET AND FUEL CELL

(71) Applicant: TOYOTA BOSHOKU KABUSHIKI KAISHA, Aichi-ken (JP)

(72) Inventors: Kunihiro Yamaura, Tokai (JP); Noriyuki Yagi, Kariya (JP)

(73) Assignee: TOYOTA BOSHOKU KABUSHIKI KAISHA, Aich-ken (JP)

( * ) Notice: Subject to any disclaimer, the term of this patent is extended or adjusted under 35 U.S.C. 154(b) by 158 days.

(21) Appl. No.: 15/619,926

(22) Filed: Jun. 12, 2017

(65) Prior Publication Data
US 2017/0373328 A1 Dec. 28, 2017

(30) Foreign Application Priority Data
Jun. 22, 2016 (JP) .................. 2016-123509

(51) Int. Cl.
| | |
|---|---|
| *H01M 8/0273* | (2016.01) |
| *H01M 8/2457* | (2016.01) |
| *H01M 8/24* | (2016.01) |
| *H01M 8/2483* | (2016.01) |
| *H01M 2/02* | (2006.01) |

(Continued)

(52) U.S. Cl.
CPC ....... *H01M 8/0273* (2013.01); *H01M 2/0212* (2013.01); *H01M 8/0276* (2013.01); *H01M 8/247* (2013.01); *H01M 8/2457* (2016.02); *H01M 8/2459* (2016.02); *H01M 8/2483* (2016.02); *F16J 15/06* (2013.01); *H01M 2/08* (2013.01); *H01M 8/0271* (2013.01); *H01M 8/242* (2013.01); *H01M 8/2475* (2013.01); *H01M 8/2485* (2013.01); *H01M 2008/1095* (2013.01); *H01M 2250/20* (2013.01); *Y02T 90/32* (2013.01)

(58) Field of Classification Search
CPC .. H01M 8/0273; H01M 8/0276; H01M 8/242; H01M 8/245; H01M 8/246; H01M 2/0408
See application file for complete search history.

(56) References Cited

U.S. PATENT DOCUMENTS

| | | | | |
|---|---|---|---|---|
| 5,110,692 | A * | 5/1992 | Farooque ............ | H01M 8/2485 429/460 |
| 2006/0292428 | A1* | 12/2006 | Suh ...................... | H01M 8/0228 429/434 |

(Continued)

FOREIGN PATENT DOCUMENTS

JP           2008-21636       1/2008

*Primary Examiner* — Jeremiah R Smith
(74) *Attorney, Agent, or Firm* — Greenblum & Bernstein, P.L.C.

(57) ABSTRACT

A gasket is arranged between a fastening portion of an end plate arranged at an end in a cell stacking direction of a cell stack of a fuel cell and a case covering a periphery of the cell stack. The gasket is configured to seal a gap between the fastening portion and the gasket and a gap between the case and the gasket. The gasket includes a base plate and an elastic material layer. The base plate has a slope section that connects an inner peripheral section and an outer peripheral section to each other. The inner peripheral section and the outer peripheral section are located at different positions in a thickness direction of the base plate. The slope section is inclined with respect to the inner peripheral section and the outer peripheral section.

4 Claims, 5 Drawing Sheets

(51) Int. Cl.
  *H01M 8/0276*  (2016.01)
  *H01M 8/247*  (2016.01)
  *H01M 8/2485*  (2016.01)
  *H01M 2/08*  (2006.01)
  *H01M 8/242*  (2016.01)
  *H01M 8/0271*  (2016.01)
  *F16J 15/06*  (2006.01)
  *H01M 8/1018*  (2016.01)
  *H01M 8/2475*  (2016.01)

(56) References Cited

U.S. PATENT DOCUMENTS

| | | | |
|---|---|---|---|
| 2007/0104984 A1* | 5/2007 | An | H01M 8/04225 429/414 |
| 2007/0212589 A1* | 9/2007 | Kobuchi | H01M 8/0213 429/482 |
| 2008/0093006 A1* | 4/2008 | Dillard | H01M 4/8631 156/60 |
| 2010/0159304 A1* | 6/2010 | Quek | H01M 8/006 429/469 |
| 2011/0079966 A1* | 4/2011 | Fleury | F16J 15/0887 277/648 |
| 2011/0236786 A1* | 9/2011 | Iizuka | H01M 8/0273 429/482 |
| 2014/0141351 A1* | 5/2014 | Shinohara | H01M 8/12 429/457 |

* cited by examiner

GASKET AND FUEL CELL

BACKGROUND OF THE INVENTION

The present invention relates to a gasket and a fuel cell.

As described in Japanese Laid-Open Patent Publication No. 2008-21636, a fuel cell adapted to be installed in a vehicle includes an end plate, which is arranged at an end of a cell stack in the cell stacking direction, and a case covering the periphery of the cell stack. A gasket, which maintains airtightness of the interior of the case, is arranged between the end plate and the case. The gasket is configured to seal the gap between the end plate and the gasket and the gap between the case and the gasket. By sealing these gaps, the gasket maintains airtightness of the interior of the case. The end plate of the fuel cell is manufactured using aluminum to decrease the weight of the end plate by a die casting method, which is a highly productive casting method.

However, despite the gasket arranged between the end plate and the case as described in the publication, fluid such as water may enter the gap between the opposed surfaces of the end plate and the case, which clamp the gasket, from the exterior of the case, to the point at which sealing by the gasket is effectuated with respect to the end plate and to the point at which sealing by the gasket is effectuated with respect to the case.

If the fluid that has entered the gap is salt water, the salt water may cause corrosion in the end plate, which is made of aluminum, in the vicinity of a point (hereinafter referred to as a sealing point) at which sealing by the gasket is effectuated. Such corrosion in the vicinity of the sealing point decreases sealing performance of the gasket with respect to the end plate, thus hampering maintenance of the airtightness of the interior of the case.

SUMMARY OF THE INVENTION

Accordingly, it is an objective of the present invention to provide a gasket and a fuel cell capable of restraining decrease of sealing performance caused by corrosion in the vicinity of a point at which sealing by the gasket with respect to an end plate is effectuated.

Means for achieving the foregoing objectives will now be described.

To achieve the foregoing objective and in accordance with one aspect of the present invention, a gasket is provided that is arranged between an end plate arranged at an end of a cell stack of a fuel cell in a cell stacking direction and a case covering a periphery of the cell stack. The gasket is configured to seal a gap between the end plate and the gasket and a gap between the case and the gasket. The gasket includes a base plate that extends along opposed surfaces of the end plate and the case at a position between the end plate and the case, and an elastic material layer arranged on and along a surface of the base plate to be located between the base plate and the end plate. The base plate includes an inner peripheral section located close to an inner side of the case, an outer peripheral section located close to an outer side of the case, and a slope section located between the inner peripheral section and the outer peripheral section to connect the inner peripheral section and the outer peripheral section to each other. The inner peripheral section and the outer peripheral section are located at different positions in a thickness direction of the base plate. The slope section is inclined with respect to the inner peripheral section and the outer peripheral section.

In the above described gasket, the elastic layer material is preferably also arranged on and along a surface of the base plate to be located between the base plate and the case.

A fuel cell is provided in which the above described gasket is arranged between an end plate arranged at an end of a cell stack in a cell stacking direction and a case covering a periphery of the cell stack.

The above described fuel cell is preferably configured such that, in a surface of the end plate on a side corresponding to the cell stack, a passage through which fluid is selectively supplied to and discharged from the cell stack is provided, and a plastic layer is arranged to insulate the cell stack and the end plate from each other. The plastic layer preferably extends to a surface of the end plate that is opposed to the case.

DETAILED DESCRIPTION OF THE PREFERRED EMBODIMENTS

A gasket and a fuel cell in which the gasket is used according to one embodiment will now be described with reference to FIGS. 1 to 6.

Figure 1:
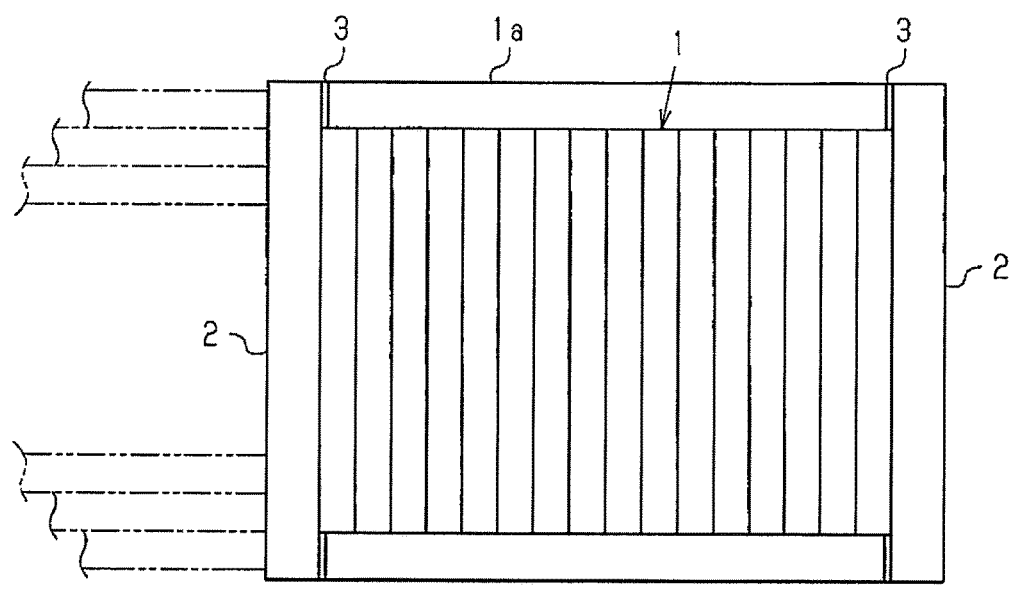
FIG. 1 is a schematic diagram representing the configuration of a fuel cell as a whole.

As shown in FIG. 1, the fuel cell includes end plates 2 made of aluminum, which are arranged in respective ends in the cell stacking direction (the leftright direction in FIG. 1) of a cell stack 1, and a case 1a made of aluminum, which covers the periphery of the cell stack 1. The end plates 2 and the case 1a are manufactured by a die casting method, which is a highly productive casting method.

Each of the end plates 2 is fastened to the case 1a with a gasket 3 held between the end plate 2 and the case 1a. By fastening the end plates 2 to the case 1a, the cell stack 1 is pressed by the end plates 2 in the cell stacking direction. This maintains the cell stacking structure of the cell stack 1. Also, by fastening the end plates 2 to the case 1a, each of the gaskets 3 held between the corresponding end plate 2 and the case 1a maintains airtightness of the interior of the case 1a.

One of the end plates 2 (in this example, the left one of the end plates 2 as viewed in FIG. 1) of the fuel cell functions as a manifold through which fluid, such as hydrogen (fuel gas), air (oxidation gas), and coolant water (coolant liquid) is selectively supplied to and discharged from the cell stack 1. The cell stack 1 generates electric power using the hydrogen and air, which are selectively supplied and discharged through the end plate 2 (the manifold), and is cooled by the coolant water, which is selectively supplied and discharged through the end plate 2.

Figure 2:
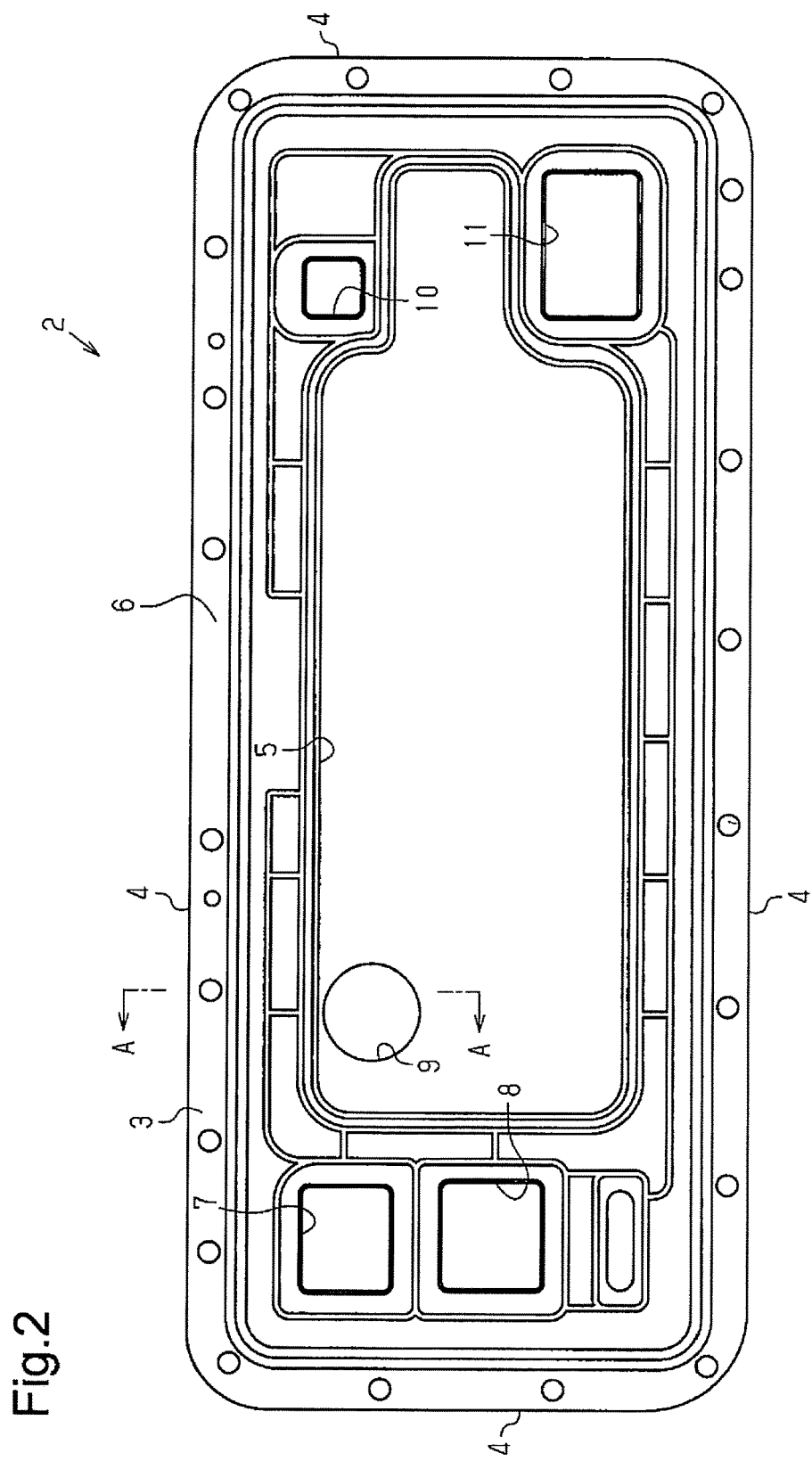
FIG. 2 is a plan view showing an end plate and a gasket of the fuel cell of FIG. 1 as viewed from the side corresponding to a cell stack.

FIG. 2 shows a state of the end plate 2 and the corresponding gasket 3 of FIG. 1 as viewed from the side corresponding to the cell stack 1. The end plate 2 is shaped as a rectangular plate having two long sides and two short sides. Also, fastening portions 4, which extend along the long sides and the short sides of the end plate 2, and the gasket 3, which extends along the fastening portions 4 and has a closed shape, are arranged in an outer peripheral section of the end plate 2.

Through-holes 7 to 11, which extend through the end plate 2 in the thickness direction (the direction perpendicular to the sheet surface of FIG. 2), are formed in a section of the end plate 2 surrounded by the fastening portions 4. A recess 5, which is continuous with the through-hole 9 and elongated in the long-side direction of the end plate 2, is formed in the surface (on the side closer to the viewer of FIG. 2) of the section of the end plate 2 surrounded by the fastening portions 4 on the side corresponding to the cell stack 1. Further, a plastic layer 6, which insulates the cell stack 1 and the end plate 2 from each other, is formed by insert molding on the aforementioned surface of the end plate 2 to cover the entire portion of the surface including the inner walls of the recess 5 and the through-holes 7 to 11.

Those of the fastening portions 4 extending in the long-side direction of the end plate 2 are fastened to the case 1a (FIG. 1) using bolts while being spaced apart at predetermined intervals in the long-side direction. Those of the fastening portions 4 extending in the short-side direction of the end plate 2 are fastened to the case 1a using bolts while being spaced apart at predetermined intervals in the short-side direction. The gasket 3 is held between the fastening portions 4 of the end plate 2 and the case 1a, with the bolts extending through the gasket 3. When the fastening portions 4 of the end plate 2 are fastened to the case 1a, the through-holes 7 to 11 and the recess 5 of the end plate 2 each function as a passage through which the aforementioned fluid is selectively supplied to and discharged from the cell stack 1 in the case 1a.

Figure 3:
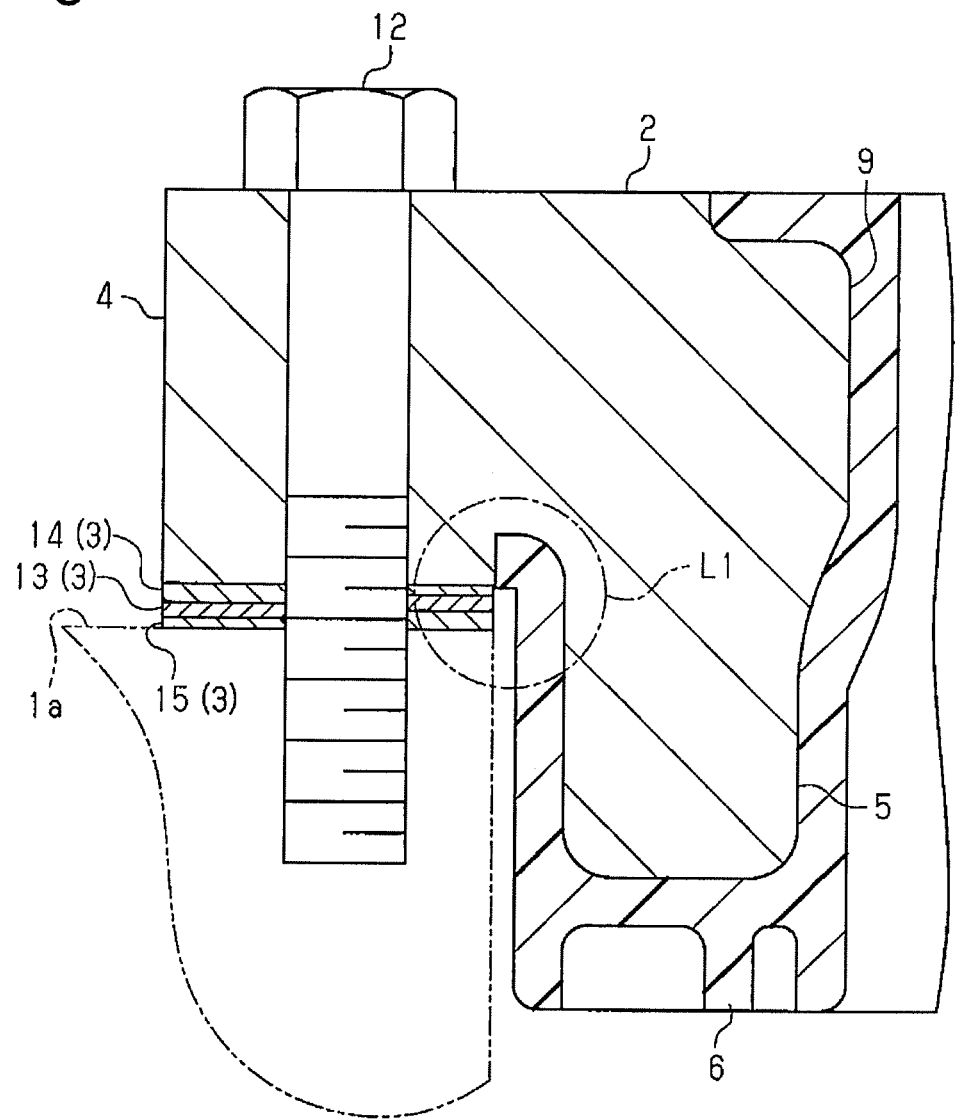
FIG. 3 is a cross-sectional view showing the state viewed in the direction represented by arrows A-A in the vicinity of a fastening portion of the end plate and the gasket of FIG. 2.

FIG. 3 shows the state viewed in the direction represented by arrows A-A of FIG. 2 in the vicinity of the corresponding fastening portion 4 and the gasket 3. As is clear from FIG. 3, the gasket 3 is located between the opposed surfaces of the fastening portion 4 of the end plate 2 and the case 1a. In this state, a bolt 12 extending through the fastening portion 4 and the gasket 3 is screwed into the case 1a, thus fastening the fastening portion 4 to the case 1a. The plastic layer 6 of the end plate 2 extends to the surface of the fastening portion 4 that is opposed to the case 1a.

The gasket 3 will now be described.

Figure 4:
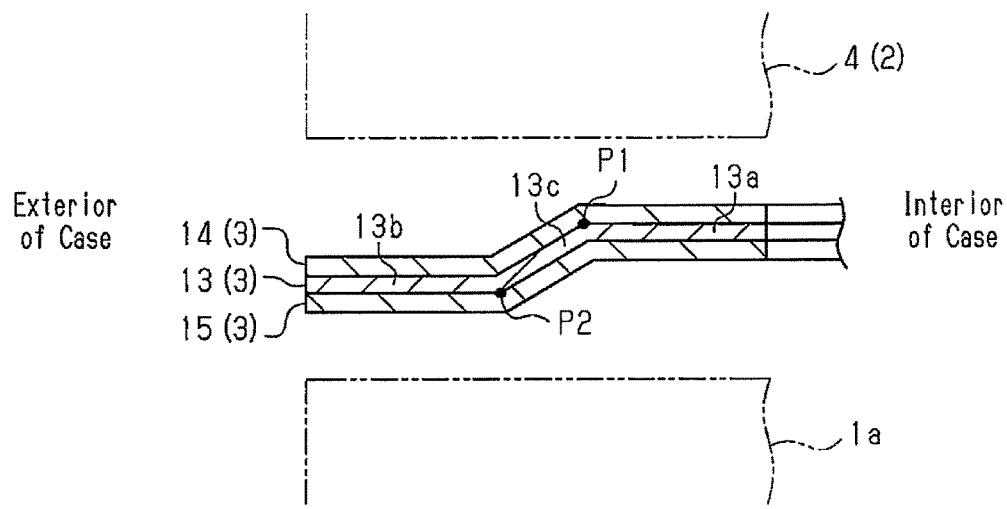
FIG. 4 is a cross-sectional view showing the gasket before being held between the opposed surfaces of the fastening portion of the end plate and a case.

FIG. 4 shows a state of the gasket 3 being held between the opposed surfaces of the fastening portion 4 of the end plate 2 and the case 1a as illustrated in FIG. 3.

As shown by FIG. 4, the gasket 3 includes a base plate 13 made of metal and an elastic material layer 14 made of rubber. The base plate 13 extends along the opposed surfaces of the fastening portion 4 of the end plate 2 and the case 1a at a position between the fastening portion 4 of the end plate 2 and the case 1a. The elastic material layer 14 is arranged on and along a surface of the base plate 13 to be located between the base plate 13 and the end plate 2 (the fastening portion 4). Also, an elastic material layer 15, which is similar to the elastic material layer 14, is arranged on and along the surface of the base plate 13 to be located between the base plate 13 and the case 1a. The elastic material layers 14, 15 may, instead of rubber, be made of any material. For example, the elastic material layers 14, 15 may be made of plastic or a mixture of plastic and rubber.

The base plate 13 has an inner peripheral section 13a, an outer peripheral section 13b, and a slope section 13c. The inner peripheral section 13a is located close to an inner side of the case 1a (the right side in FIG. 4). The outer peripheral section 13b is located close to an outer side of the case 1a (the left side in FIG. 4). The slope section 13c is located between the inner peripheral section 13a and the outer peripheral section 13b and connects the inner peripheral section 13a and the outer peripheral section 13b to each other. The inner peripheral section 13a and the outer peripheral section 13b are located at different positions in the thickness direction of the base plate 13 (the vertical direction in FIG. 4). The slope section 13c is inclined with respect to the inner peripheral section 13a and the outer peripheral section 13b.

Figure 5:
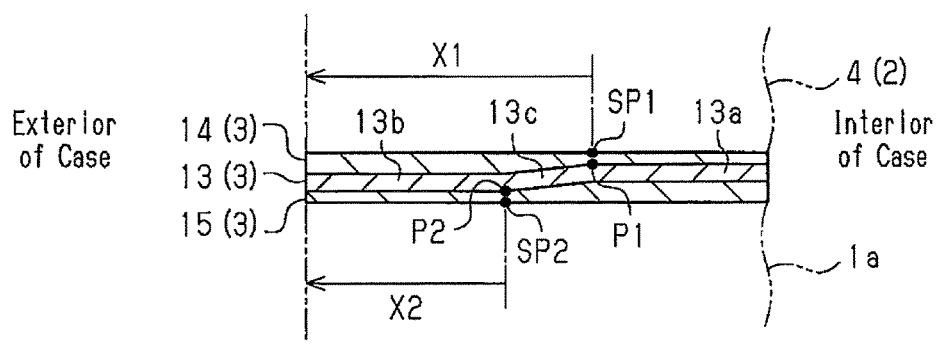
FIG. 5 is a cross-sectional view showing the gasket between the opposed surfaces of the fastening portion of the end plate and the case when the fastening portion is fastened to the case.

FIG. 5 shows the gasket 3 between the fastening portion 4 of the end plate 2 and the case 1a when the fastening portion 4 is fastened to the case 1a.

At this time, a boundary section P1 between the slope section 13c and the inner peripheral section 13a of the base plate 13 of the gasket 3 is pressed against the end plate 2 (the fastening portion 4). This presses the section corresponding to the boundary section P1 in the elastic material layer 14, which is arranged on the surface of the base plate 13 to be located between the base plate 13 and the fastening portion 4, against the fastening portion 4 to effectuate sealing with respect to the fastening portion 4 (the end plate 2). At this time, on the other hand, a boundary section P2 between the slope section 13c and the outer peripheral section 13b of the base plate 13 is pressed against the case 1a. This presses the section corresponding to the boundary section P2 in the elastic material layer 15, which is arranged on the surface of the base plate 13 to be located between the base plate 13 and the case 1a, against the case 1a to effectuate sealing with respect to the case 1a.

Throughout the zone (the zone represented by arrow X1) that extends from the point at which sealing by the gasket 3 (the elastic material layer 14) with respect to the fastening portion 4 is effectuated (hereinafter, referred to as a first sealing point SP1) to the exterior of the case 1a, the elastic material layer 14 of the gasket 3 is held in tight contact with the surface of the fastening portion 4 that is opposed to the case 1a. Therefore, even if fluid such as salt water enters the gap between the opposed surfaces of the fastening portion 4 and the case 1a, which hold the gasket 3, from the exterior of the case 1a (the left side in FIG. 4), entry of the fluid to the first sealing point SP1 on the fastening portion 4 is restrained. This restrains, even in the fuel cell employing the end plates 2 made of aluminum, corrosion caused by the salt water in the vicinity of the point (the first sealing point SP1) at which sealing by the gasket 3 with respect to the end plate 2 (the fastening portion 4) is effectuated and decrease of sealing performance.

Also, throughout the zone (the zone represented by arrow X2) that extends from the point at which sealing by the gasket 3 (the elastic material layer 15) with respect to the case 1a is effectuated (hereinafter, referred to as a second sealing point SP2) to the exterior of the case 1a, the elastic material layer 15 of the gasket 3 is held in tight contact with the surface of the case 1a that is opposed to the fastening portion 4. Therefore, even if fluid such as salt water enters the gap between the opposed surfaces of the fastening portion 4 and the case 1a, which clamp the gasket 3, from the exterior of the case 1*a* (the left side in FIG. 4), entry of the fluid to the second sealing point SP2 on the case 1*a* is restrained. This restrains, even in the fuel cell employing the case 1*a* made of aluminum, corrosion caused by the salt water in the vicinity of the point (the second sealing point SP2) at which sealing by the gasket 3 with respect to the case 1*a* is effectuated and decrease of sealing performance.

The present embodiment as described above has the following advantages.

(1) Even if the end plate 2 made of aluminum is employed in the fuel cell, corrosion in the vicinity of the first sealing point SP1 of the end plate 2 (the fastening portion 4) and decrease of sealing performance are restrained.

(2) Even if the case 1*a* made of aluminum is employed in the fuel cell, corrosion in the vicinity of the second sealing point SP2 of the case 1*a* and decrease of sealing performance are restrained.

Figure 6:
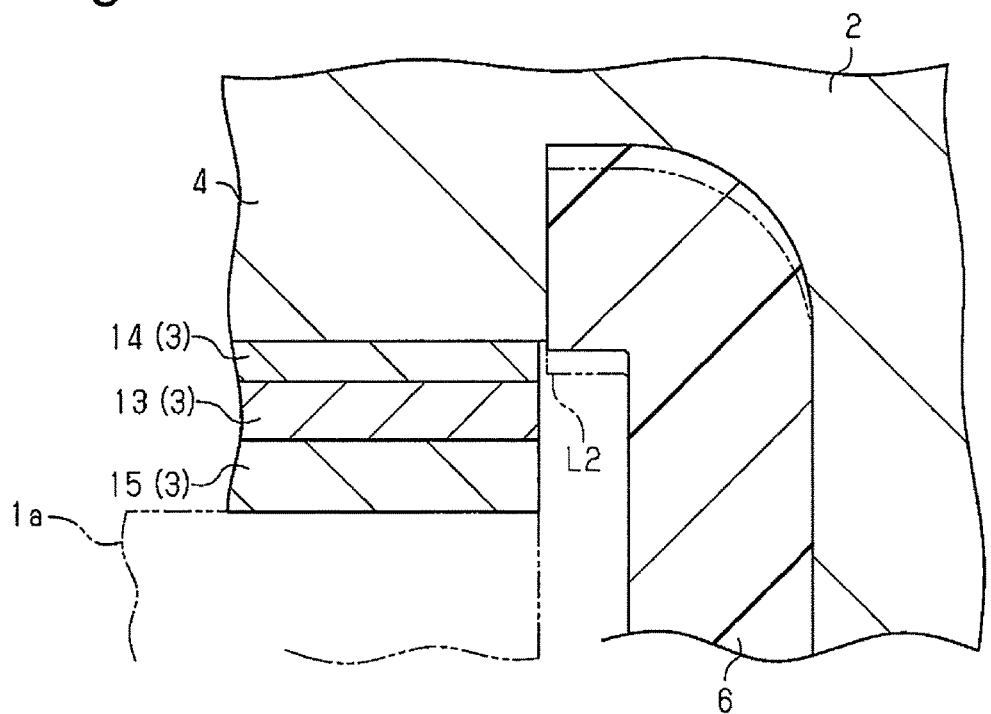
FIG. 6 is an enlarged cross-sectional view showing the vicinity of an end of a plastic layer of FIG. 3, which is the section encircled by the long dashed short dashed line L1.

(3) With reference to FIG. 6, as the plastic layer 6 of the end plate 2 cools down and contracts after molding, the end of the plastic layer 6 on the side corresponding to the opposed surfaces of the fastening portion 4 and the case 1*a* may be separated from the end plate 2, thus becoming displaced to a great extent toward a section between the opposed surfaces of the fastening portion 4 and the case 1*a*, as represented by the long dashed double-short dashed line L2. However, the gasket 3 held between the opposed surfaces of the fastening portion 4 and the case 1*a* increases the distance between the opposed surfaces. As a result, when the end of the plastic layer 6 is separated from the end plate 2 and displaced as represented by the long dashed double-short dashed line L2, the end is restrained from being caught between the opposed surfaces of the fastening portion 4 and the case 1*a*, as has been described.

The above described embodiments may be modified as follows.

If the case 1*a* is made of any metal other than aluminum, the elastic material layer 15 may be omitted from the gasket 3. In this case, when each fastening portion 4 of each end plate 2 is fastened to the case 1*a*, the boundary section P2 of the base plate 13 is pressed against the case 1*a* in the gasket 3, which is located between the opposed surfaces of the fastening portion 4 and the case 1*a*. This effectuates sealing by the gasket 3 with respect to the case 1*a*.

Figure 7:
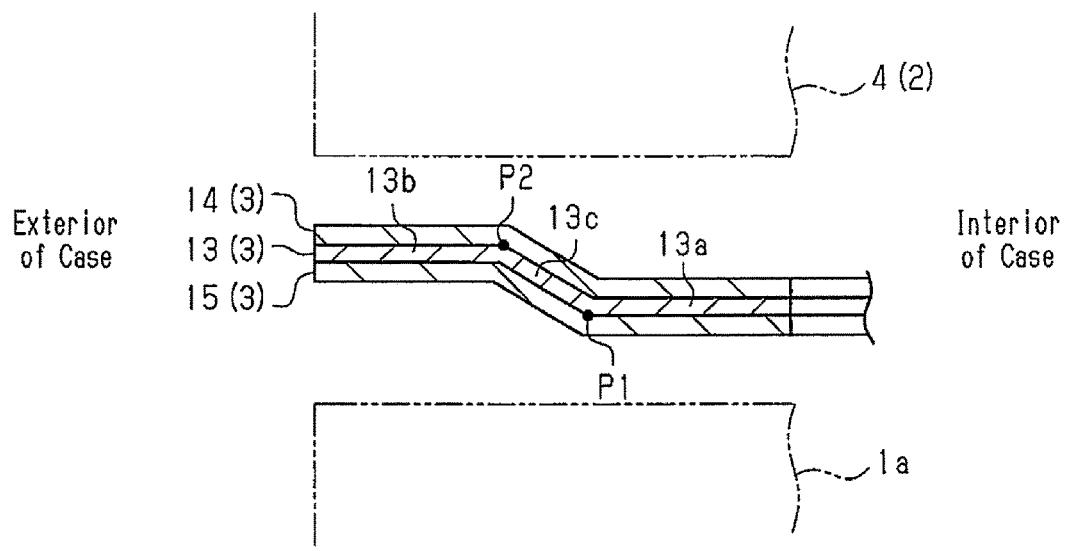
FIG. 7 is a cross-sectional view showing a gasket according to a modification.

As illustrated in FIG. 7, in the gasket 3, the positional relationship between the inner peripheral section 13*a* and the outer peripheral section 13*b* may be reversed from that of the illustrated embodiment in the thickness direction of the base plate 13. In this case, when the fastening portion 4 of the end plate 2 is fastened to the case 1*a*, the boundary section P2 between the slope section 13*c* and the outer peripheral section 13*b* of the base plate 13 is pressed against the fastening portion 4 (the end plate 2), and the boundary section P1 between the slope section 13*c* and the inner peripheral section 13*a* is pressed against the case 1*a* in the gasket 3, which is located between the opposed surfaces of the fastening portion 4 and the case 1*a*. As a result, in the elastic material layer 14, which is arranged on the surface of the base plate 13 to be located between the base plate 13 and the fastening portion 4, the section corresponding to the boundary section P2 is pressed against the fastening portion 4, thus effectuating sealing with respect to the fastening portion 4 (the end plate 2). Meanwhile, in the elastic material layer 15, which is arranged on the surface of the base plate 13 to be located between the base plate 13 and the case 1*a*, the section corresponding to the boundary section P1 is pressed against the case 1*a*, thus effectuating sealing with respect to the case 1*a*.

The invention claimed is:

1. A gasket arranged between an end plate arranged at an end of a cell stack of a fuel cell in a cell stacking direction and a case covering a periphery of the cell stack, wherein
the gasket is configured to seal a gap between the end plate and the gasket and a gap between the case and the gasket,
the gasket comprises:
a base plate that extends along opposed surfaces of the end plate and the case at a position between the end plate and the case; and
an elastic material layer arranged on and along a surface of the base plate to be located between the base plate and the end plate,
the base plate includes
an inner peripheral section located close to an inner side of the case,
an outer peripheral section located close to an outer side of the case, and
a slope section located between the inner peripheral section and the outer peripheral section to connect the inner peripheral section and the outer peripheral section to each other,
the inner peripheral section and the outer peripheral section are located at different positions in a thickness direction of the base plate, and
the slope section is inclined with respect to the inner peripheral section and the outer peripheral section.

2. The gasket according to claim 1, wherein the elastic layer material is also arranged on and along a surface of the base plate to be located between the base plate and the case.

3. A fuel cell comprising the gasket according to claim 1, wherein the gasket is arranged between an end plate arranged at an end of a cell stack in a cell stacking direction and a case covering a periphery of the cell stack.

4. The fuel cell according to claim 3, wherein
in a surface of the end plate on a side corresponding to the cell stack,
a passage through which fluid is selectively supplied to and discharged from the cell stack is provided, and
a plastic layer is arranged to insulate the cell stack and the end plate from each other,
the plastic layer extends to a surface of the end plate that is opposed to the case.

* * * * *